United States Patent
Kornegay et al.

(10) Patent No.: US 7,865,669 B2
(45) Date of Patent: Jan. 4, 2011

(54) SYSTEM AND METHOD FOR DYNAMICALLY SELECTING THE FETCH PATH OF DATA FOR IMPROVING PROCESSOR PERFORMANCE

(75) Inventors: Marcus L. Kornegay, Durham, NC (US); Ngan N. Pham, Raleigh, NC (US)

(73) Assignee: International Machines Business Corporation, Armonk, NY (US)

( * ) Notice: Subject to any disclaimer, the term of this patent is extended or adjusted under 35 U.S.C. 154(b) by 601 days.

(21) Appl. No.: 11/832,803

(22) Filed: Aug. 2, 2007

(65) Prior Publication Data

US 2009/0037664 A1 Feb. 5, 2009

(51) Int. Cl.
*G06F 12/08* (2006.01)

(52) U.S. Cl. ............. 711/138; 711/117; 711/118; 711/119; 711/122

(58) Field of Classification Search ......... 711/117–119, 711/122, 138
See application file for complete search history.

(56) References Cited

U.S. PATENT DOCUMENTS

| | | |
|---|---|---|
| 5,625,793 A | 4/1997 | Mirza |
| 5,978,888 A | 11/1999 | Arimilli et al. |
| 6,647,466 B2 | 11/2003 | Steely, Jr. |
| 6,681,297 B2 | 1/2004 | Chauvel et al. |
| 7,596,662 B2 * | 9/2009 | Makineni et al. ............ 711/122 |
| 2006/0112233 A1 | 5/2006 | Hu et al. |

OTHER PUBLICATIONS

Chi et al., "Improving Cache Performance by Selective Cache Bypass", pp. 277-285, IEEE, 1989.
Wu et al., "Compiler Managed Micro-cache Bypassing for High Performance EPIC Processors", pp. 134-145, IEEE, 2002.

* cited by examiner

*Primary Examiner*—Jasmine Song
(74) *Attorney, Agent, or Firm*—Cynthia S. Seal; Hoffman Warnick LLC

(57) ABSTRACT

A system and method for dynamically selecting the data fetch path for improving the performance of the system improves data access latency by dynamically adjusting data fetch paths based on application data fetch characteristics. The application data fetch characteristics are determined through the use of a hit/miss tracker. It reduces data access latency for applications that have a low data reuse rate (streaming audio, video, multimedia, games, etc.) which will improve overall application performance. It is dynamic in a sense that at any point in time when the cache hit rate becomes reasonable (defined parameter), the normal cache lookup operations will resume. The system utilizes a hit/miss tracker which tracks the hits/misses against a cache and, if the miss rate surpasses a prespecified rate or matches an application profile, the hit/miss tracker causes the cache to be bypassed and the data is pulled from main memory or another cache thereby improving overall application performance.

9 Claims, 4 Drawing Sheets

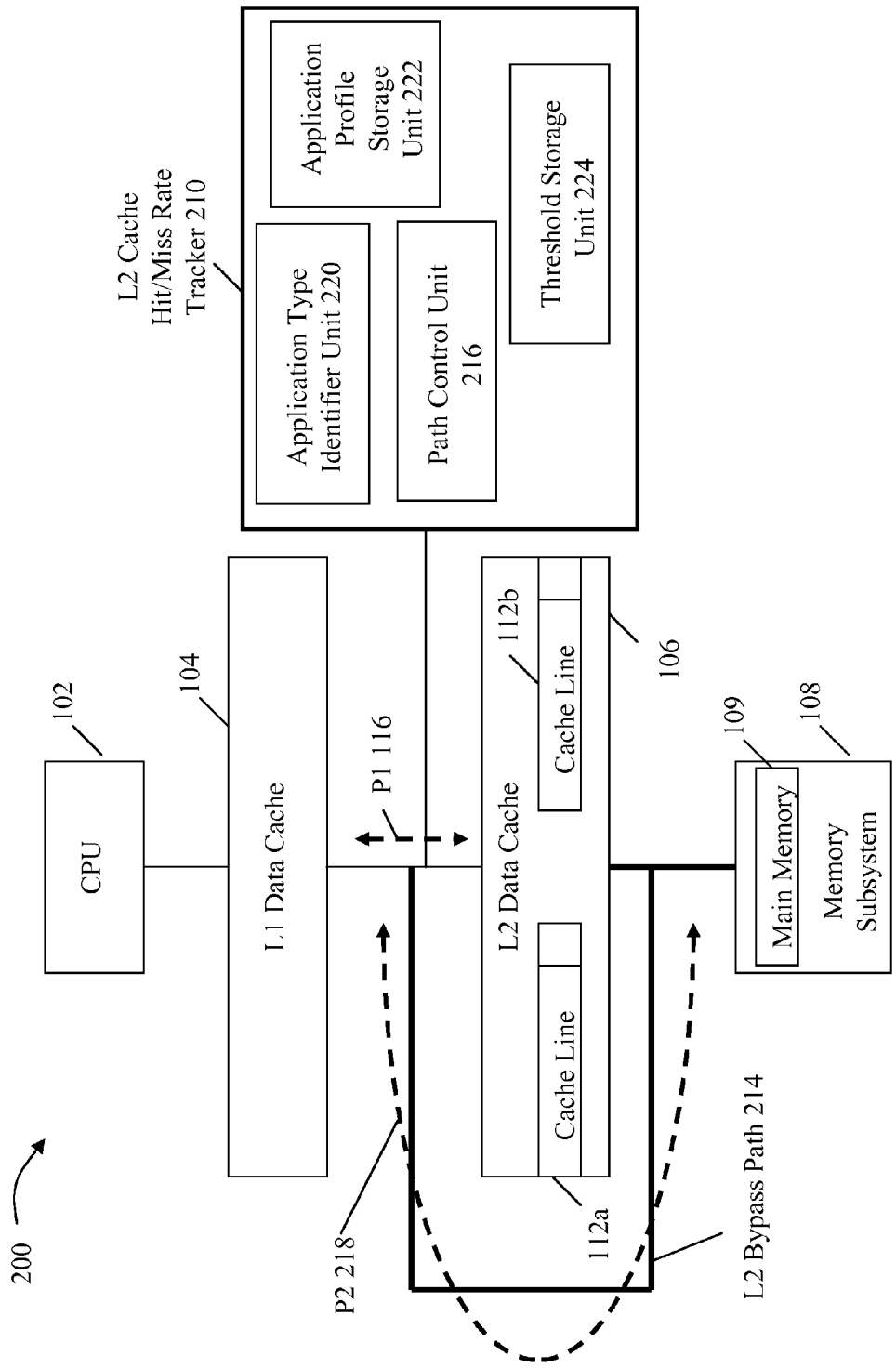
Figure 2 – Dynamic Fetch System

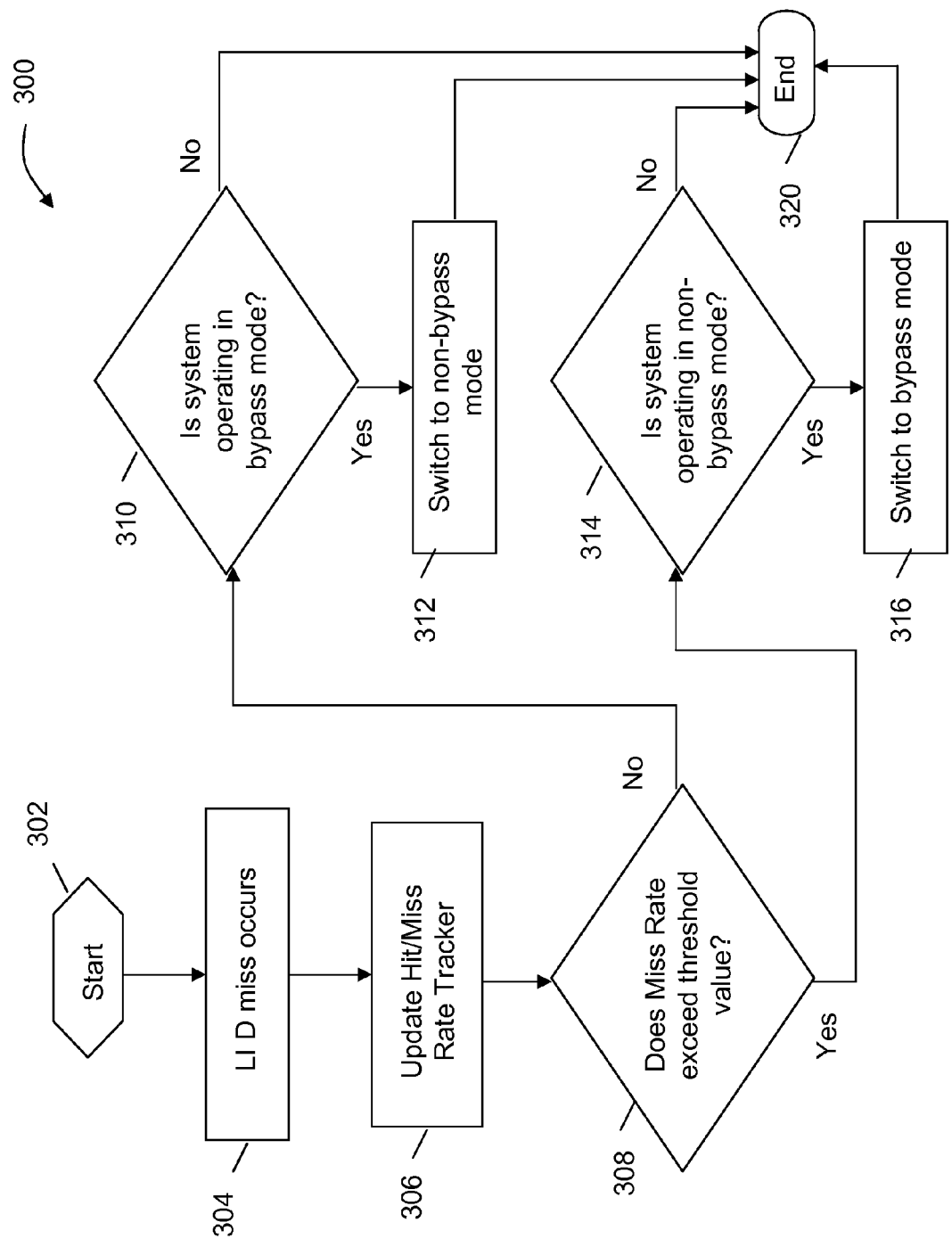

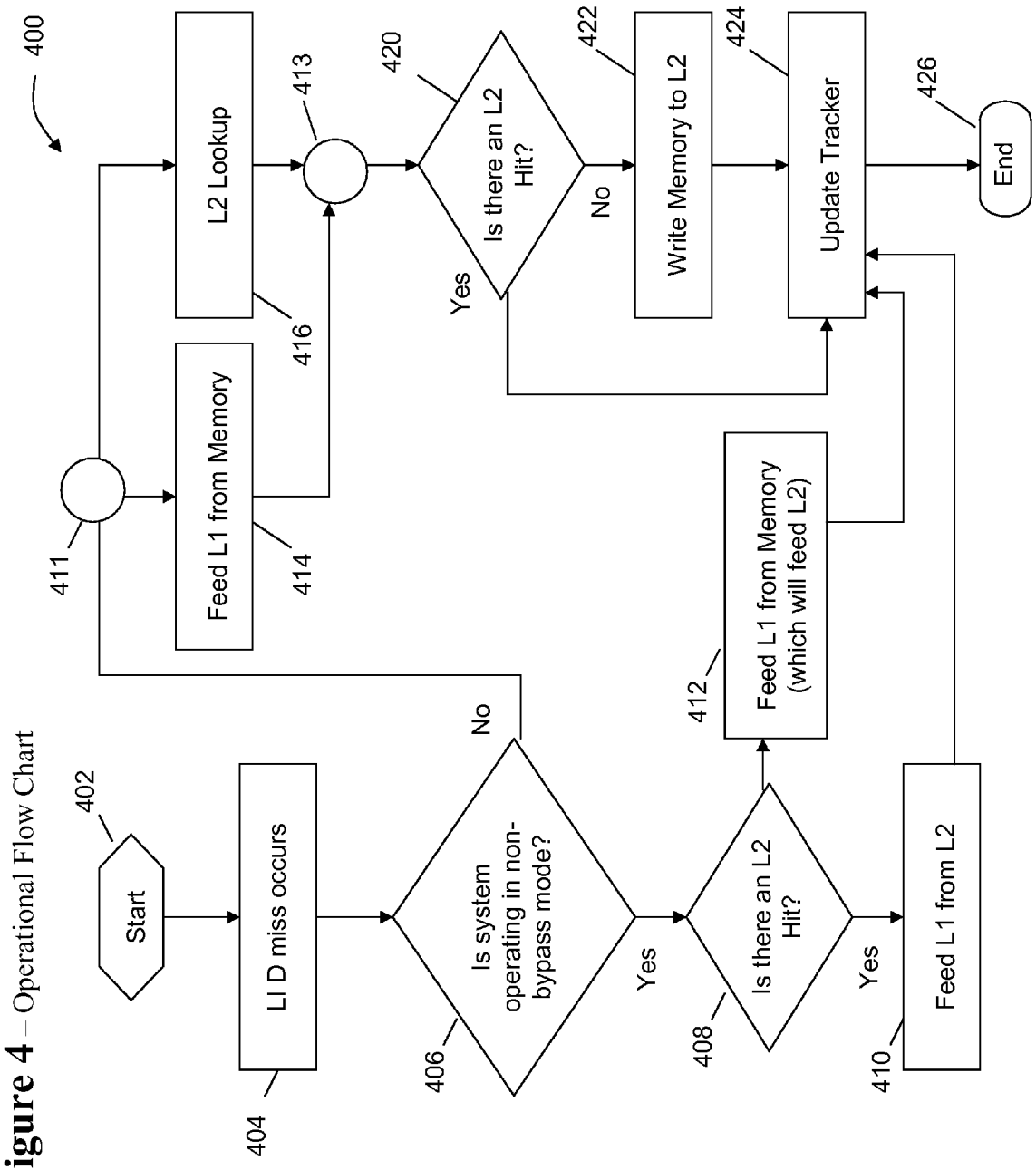
Figure 4 – Operational Flow Chart

SYSTEM AND METHOD FOR DYNAMICALLY SELECTING THE FETCH PATH OF DATA FOR IMPROVING PROCESSOR PERFORMANCE

FIELD OF THE INVENTION

The present invention relates generally to cache data fetching and, more specifically, to a system and method for dynamically selecting the fetch path for improving the performance of a processor.

BACKGROUND OF THE INVENTION

As a matter of background, a CPU cache is a cache used by the central processing unit of a computer to reduce the average time to access memory. This can be seen in System 100 shown in FIG. 1 where there is a CPU 102, L1 Data Cache 104, L2 Data Cache 106 and Memory Subsystem 108 which comprises the main memory. L1 Data Cache 104 and L2 Data Cache 106 comprise a multi-level cache to be discussed below. The cache is a smaller, faster memory which stores copies of the data from the most frequently used main memory locations. As long as most memory accesses are to cached memory locations, the average latency of memory accesses will be low as the access latency of main memory is relatively long. The main memory has a cache memory (L1, L2 in this example) and each location in each memory has a datum (a cache line 112a, 112b). Each location in each memory also has an index, which is a unique number used to refer to that location. The index for a location in main memory is called an address. Each location in the cache has a tag, which contains the index of the datum in main memory which has been cached. In a CPU's data cache, these entries are called cache lines or cache blocks.

When the processor wishes to read or write a location in main memory, it first checks whether that memory location is in the cache—first L1 then (using communications path P1 116) L2 and so on. This is accomplished by comparing the address of the memory location to all tags in the cache that might contain that address. If the processor finds that the memory location is in the cache, a cache hit has occurred, otherwise it is a cache miss. For instance, a cache miss on L1 causes the processor to then check L2 (using communications path P1 116) and so forth. In the case of a cache hit, the processor immediately reads or writes the data in the cache line. The proportion of accesses that result in a cache hit is known as the hit rate, and is a measure of the effectiveness of the cache.

Misses from cache(s) are comparatively slow because they require the data to be transferred from main memory 109. This transfer incurs a delay since main memory is much slower than cache memory, and also incurs the overhead for recording the new data in the cache before it is delivered to the processor.

Of course, larger caches have better hit rates but longer latency. To ameliorate this tradeoff, many computers use multiple levels of cache, with small fast caches backed up by larger slower caches. As the latency difference between main memory and the fastest cache has become larger, some processors have begun to utilize as many as three levels of on-chip cache. For example, in 2003, Itanium 2 began shipping with a 6 MiB unified level 3 cache on-chip. The IBM® Power 4 series has a 256 MiB level 3 cache off chip, shared among several processors.

Multi-level caches generally operate by checking the smallest, fastest Level 1 (L1) cache first; if it hits, the processor proceeds at high speed. If the smaller cache misses, the next larger cache (L2) is checked, and so on, before main memory is checked. Each cache check takes time and causes memory access latency.

Larger computers sometimes have another cache between the L2 cache and main memory called an L3 cache. The benefits of an off chip L3 cache depend on the application's access patterns. High-end x86 workstations and servers are now available with an L3 cache option implemented on the microprocessor die, increasing the speed and reducing the cost substantially. For example, Intel's Xeon MP product code-named "Tulsa" features 16 MiB of on-die L3 cache, shared between two processor cores.

For all applications, the data accessed and used is cached. However, for some applications, like streaming audio, video, multimedia, and games, the reuse rate of the cached data or data lines in processor cache (L2 and L3 and beyond) is low. That is, new data is required for each access and, therefore, has not been previously stored in any of the caches. The problem for these types of applications, which require high speed responses to the users and which rarely use data stored in caches beyond L1, is that the systems of the prior art require that, for each data request, the CPU first checks L1 then, if there is a L1 miss, the CPU checks L2 and so on until the data is finally retrieved from main memory. Of course, each cache access attempt takes time and consumes system speed. With the types of applications discussed above, most of the data is not reused so will not be stored in the caches beyond L1 (L2, L3, etc.) although the systems of the prior art require that the caches beyond L1 (L2, etc.) be checked to see if the data is cached. This causes a performance problem. Known solution solutions simply pay the L2, L3, etc., cache lookup penalty which hurts application performance.

There presently is a need for a system and method for dynamically selecting data fetch paths for improving the performance of the system.

BRIEF SUMMARY OF THE INVENTION

The present invention is a system and method for dynamically selecting the data fetch path for improving the performance of the system.

The dynamic data fetch system and method of the present invention improves data access latency by dynamically adjusting data fetch paths based on application data fetch characteristics or prespecified miss threshold limits. The application data fetch characteristics and number of misses are determined through the use of a hit/miss tracker. The present invention reduces data access latency for applications that have a low data reuse rate (streaming audio, video, multimedia, games, etc.) which will improve overall application performance. The present invention is dynamic in a sense that at any point in time when the L2, L3, etc., cache hit rate becomes reasonable (defined parameter), the normal cache lookup operations will resume.

The system of the present invention utilizes a hit/miss tracker which tracks the hits/misses against a cache and, if the miss rate surpasses a prespecified rate or matches an application profile, the hit/miss tracker causes the cache to be bypassed and the data is pulled from main memory or another cache thereby improving overall application performance.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 2 depicts the system of the present invention.
FIG. 3 depicts an embodiment of the method of the present invention.
FIG. 4 depicts an embodiment of the method of the present invention.

The drawings are intended to depict only typical aspects of the invention, and therefore should not be considered as limiting the scope of the invention. In the drawings, like numbering represent like elements between the drawings.

DETAILED DESCRIPTION OF THE PREFERRED EMBODIMENT OF THE PRESENT INVENTION

Figure 1:
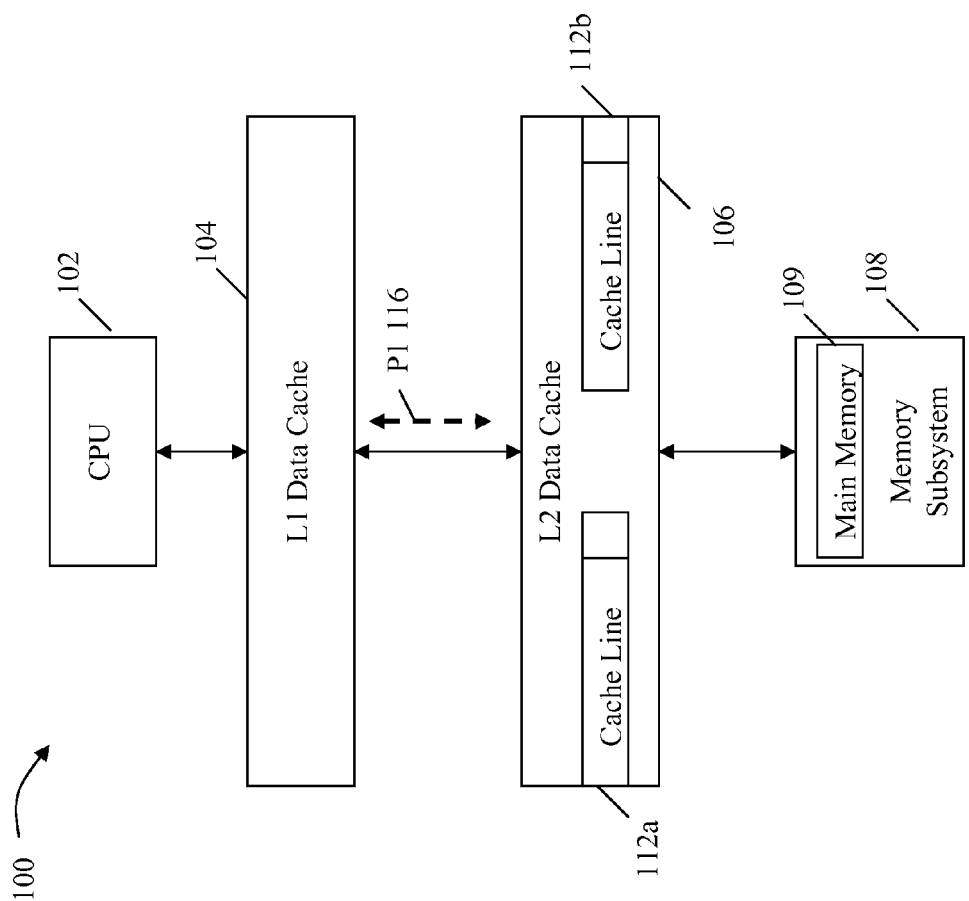
FIG. 1 depicts a system of the prior art.

The present invention provides a system and method for dynamically adjusting the data fetch paths for improving the performance of a processor.

FIG. 2 depicts the system 200 of the present invention. It comprises a CPU 102 which is connected to L1 Data Cache 104. L1 Data Cache 104 is the smallest Level 1 (L1) cache. For a data fetch, the processor checks L1 first; if it hits, the processor receives the data from L1 and proceeds at high speed. If L1 misses (that is, the data is not cached in L1), the next larger cache (L2 Data Cache 106) is checked for the requested data. If the requested data is located in L2, it is passed to CPU 102. L2 Data Cache 106 comprises Cache Lines 112a, 112b. L2 Data Cache 106 is connected to Memory Subsystem 106. The system of the present invention further comprises an L2 Data Cache Hit/Miss Rate Tracker 210. As mentioned above, the hit rate is the proportion of accesses that result in a cache hit and is a measure of the effectiveness of the cache. The system of the present invention further comprises a L2 Bypass Path 214 which allows the system 200 to bypass L2 Data Cache 106 so that the Memory Subsystem 108 communicates directly with the L1 Data Cache 104 along communications path P2 218. This results in savings on the L2 (which is a larger, slower cache) cache access requests. This is especiaL1y important when the data is not being cached in L2 as in applications such as streaming audio, video, multimedia, and games. The Memory Subsystem 108 can be located on the processor socket, could be a neighboring processor socket (cache or memory), or a off socket memory subsystem. This will depend on the architecture (SMP or NUMA) and this application covers all cases. (Symmetric multiprocessing, or SMP, is a multiprocessor computer architecture where two or more identical processors are connected to a single shared main memory. Most common multiprocessor systems today use an SMP architecture. SMP systems allow any processor to work on any task no matter where the data for that task are located in memory; with proper operating system support, SMP systems can easily move tasks between processors to balance the workload efficiently. Non-Uniform Memory Access or Non-Uniform Memory Architecture (NUMA) is a computer memory design used in multiprocessors, where the memory access time depends on the memory location relative to a processor. Under NUMA, a processor can access its own local memory faster than non-local memory, that is, memory local to another processor or memory shared between processors. NUMA architectures logically follow in scaling from SMP architectures. The Data Cache Hit/Miss Rate Tracker 110 tracks the cache hits and cache misses against L2 Data Cache 106. In the present example, the Data Cache Hit/Miss Rate Tracker 210 tracks the cache hits and cache misses against L2 Data Cache 106 but the Data Cache Hit/Miss Rate Tracker 210 could be tracking hits/misses against other caches, such as L1 Data Cache 104 or other caches, such as cache L3 (not shown), and the bypass paths may be set up to bypass those caches as well. Data Cache Hit/Miss Rate Tracker 210 controls which Path (P1 116, P2 218) is utilized by the system. Memory Subsystem 108 provides clean data to CPU 102 when a cache miss occurs and no other processor has the data cached. Data Cache Hit/Miss Rate Tracker 110 has a Path Control Unit 216 which controls which path (P1 116, P2 218) the data is fetched from depending upon whether the threshold has been surpassed. Threshold Storage Unit 224 stores the threshold values which may be preset. The threshold value can be set by processor architect based on typical cache hit rates for various applications. Trace data can be used to create certain cache hit profiles for different applications which are stored in Application Profile Storage Unit 222. For this use, Data Cache Hit/Miss Rate Tracker 210 comprises an Application Type Identifier Unit 220. Application Type Identifier Unit 220 has stored, locally, the profiles of different types of applications. For instance, some types of applications utilize cache stored data more frequently than others. Others, like streaming audio, video, multimedia, and games, the reuse rate of the cached data or data lines in processor cache (L2 and L3 and beyond) is low. Profiles for these types of applications are stored Application Profile Storage Unit 222. As the hits/misses are tracked by the Data Cache Hit/Miss Rate Tracker 210, they are compared against the hit/miss rates noted in the application profiles in the Application Profile Storage Unit 222. If it is determined that the hit/miss profile matches an application which has a low cache reuse rate, the bypass path is selected by the Path Control Unit 216. Alternatively, the user can write to a register which has different bit values that map to threshold values for various applications. The main memory can be in the CPU or in the Memory Subsystem (as is shown in the present invention). A CPU architecture that is NUMA based would have memory on the CPU while a NUMA architecture that is SMP and Non-NUMA would have a central memory subsystem that all processors access. For this application, the architecture could be either or any other architecture for that matter.

FIG. 3 depicts an embodiment of the method 300 of the present invention. It starts at step 302 and continues to step 304 where an L1 Data Cache miss occurs. Since there was a cache miss, the Hit/Miss Rate Tracker is updated at step 306. As mentioned above, beforehand, a hit/miss rate threshold is specified. Once the miss rate threshold has been exceeded, it is determined that time is being wasted on checking L2 as the data, more likely than not, is not going to be cached. If the threshold has been exceeded, the present invention bypasses L2 (or whichever cache is being monitored). If not, the normal process applies. This way, the cache access can be dynamically modified based upon the type of application being utilized. At 308, it is determined whether the miss rate threshold has been exceeded. If not, it is determined, at step 310, whether the system is operating in bypass mode. Because the threshold has not been exceeded, L2 does not need to be bypassed. If not, the method/process ends at 320.

If so, the system is switched to non-bypass mode at 312 and the method/process ends at 320. If the miss rate threshold has been exceeded at step 308, it is determined, at step 314, whether the system is operating in non-bypass mode. If not, the method/process ends at 320. If so, the system is switched to bypass mode by the hit/miss tracker at 316 and the method/process ends at 320. By bypassing L2, the latency of memory checks for data which may be (but, according to the miss rate, more likely not) cached in L2 is avoided thereby improving the performance of the processor and the system.

FIG. 4 depicts an embodiment of the method 400 of the present invention illustrating the operation flow of the present invention. Method 400 starts at step 402 and continues to step 404 where a L1 Data Cache miss occurs. At step 406, it is determined by the hit/miss tracker whether the system is operating in non-bypass mode. If so, at step 408, it is determined by the hit/miss tracker whether there is an L2 Data Cache hit. If so, L1 Data Cache is fed the data from L2 Data Cache at 410 and the Tracker gets updated at 424 and the process ends at 426. If not, L1 Data Cache is fed from the Memory Subsystem at 414. At step 416, an L2 Data Cache look-up is made. At step 418, it is determined whether there is an L2 Data Cache hit by the hit/miss tracker. If not, at step 422, the data is written to L2 Data Cache and continues to step 424 where the Hit/Miss Tracker is updated. If so, the Hit/Miss Tracker is updated accordingly at step 424 and the method/process ends at 426.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A system for dynamically adjusting the fetch paths in a multi-level cache, the system comprising:
   a main memory including data;
   a first-level cache included in the multi-level cache and connected to the main memory by a first path;
   a second-level cache larger than the first-level cache, included in the multi-level cache and connected to the first-level cache and the main memory by the first path;
   a central processing unit (CPU) for fetching data from at least one of: the first-level cache, the second level cache, or the main memory;
   a hit/miss rate tracker connected to the first path, the first-level cache and the second-level cache, the hit/miss rate tracker for tracking cache misses on the second-level cache associated with a type of application; and
   a bypass path connected to the hit/miss rate tracker, the first-level cache and the main memory, to bypass the second-level cache and fetch the data from the main memory in response to the miss rate exceeding a prespecified application-specific threshold.

2. The system of claim 1 wherein the hit/miss tracker comprises a path control unit for controlling which path the data is fetched from.

3. The system of claim 1 wherein the hit/miss tracker comprises an application type identifier for identifying the type of application which is being run.

4. The system of claim 3 wherein the hit/miss tracker further comprises an application profile storage unit for storing the cache hit/miss profiles of application types.

5. The system of claim 4 where the hit/miss tracker utilizes the application type identifier and the application profile storage unit to determine the application type and select between the first path and the bypass path based upon the determined application type.

6. The system of claim 1 further comprising a threshold storage unit for storing the prespecified application-specific thresholds of the second cache.

7. The system of claim 1, wherein the hit/miss rate tracker determines the prespecified application-specific threshold by compiling trace data associated with at least one application type, the trace data indicating a hit/miss rate of the at least one application.

8. The system of claim 1, wherein the CPU includes a non-uniform memory access (NUMA) architecture.

9. The system of claim 1, wherein the CPU includes a symmetric multiprocessing (SMP) architecture.

* * * * *